United States Patent [19]
Lindsay

[11] Patent Number: 5,155,361
[45] Date of Patent: Oct. 13, 1992

[54] POTENTIOSTATIC PREPARATION OF MOLECULAR ADSORBATES FOR SCANNING PROBE MICROSCOPY

[75] Inventor: Stuart M. Lindsay, Tempe, Ariz.

[73] Assignee: The Arizona Board of Regents, a body corporate acting for and on behalf of Arizona State University, Tempe, Ariz.

[21] Appl. No.: 736,095

[22] Filed: Jul. 26, 1991

[51] Int. Cl.$^5$ .................. H01J 37/26; H01J 37/20; G01N 1/28
[52] U.S. Cl. .................. 250/307; 250/304; 250/440.11; 361/234; 204/153.1; 204/400; 204/403
[58] Field of Search .................. 250/307, 304, 440.1; 361/234; 204/153.1, 400, 403

[56] References Cited

U.S. PATENT DOCUMENTS 4,868,396  9/1989  Lindsay .................. 250/440.1
4,969,978  11/1990  Tomita et al. .................. 204/153.1

Primary Examiner—Jack I. Berman
Attorney, Agent, or Firm—Richard R. Mybeck

[57] ABSTRACT

A method of preparing molecular adsorbates for scanning probe microscopy by potentiostatic methods. Negatively charged molecules are deposited upon and held to a substrate with an electrochemical cell having a gold substrate, a platinum wire counter electrode and a silver wire reference electrode. The polymer to be observed is dissolved into a buffer solution which is non-reactive with the substrate which is gold (111).

11 Claims, 1 Drawing Sheet

POTENTIOSTATIC PREPARATION OF MOLECULAR ADSORBATES FOR SCANNING PROBE MICROSCOPY

INTRODUCTION

This present invention relates generally to scanning probe microscopy and more particularly to the potentiostatic preparation of molecular adsorbates for study with scanning probe microscopes.

BACKGROUND OF THE INVENTION

Various ways have heretofore been proposed for chemically reacting molecules with a metal substrate in an electrochemistry cell. In some cases, the prior methodology allows molecules to be bonded strongly enough so that they can be imaged in a scanning tunnelling microscope (STM) or in the atomic force microscope (AFM). However, in the case of negatively charged molecules, such as DNA, it is extremely difficult to get them to adhere to an electrode because most metal surfaces are intrinsically negatively charged and, as such, repel the molecule. Thus a clear need exists for new and improved technology for the potentiostatic preparation of negatively charged molecules adsorbates such as DNA to enable them to be properly bonded to suitable substrate so they can be imaged in scanning tunnelling microscope (STM) or atomic force microscopes (AFM). It is toward this end that the present invention is directed.

BRIEF SUMMARY OF THE INVENTION

The present invention is predicated upon the discovery of a remarkably simple procedure for getting negatively charged molecules onto a substrate and holding them there. The new methodology is based in part on the concept that DNA (or any other negatively charged molecule) can be attracted to a surface which is positively charged by virtue of its interaction with an electrolyte (See: Lindsay et al, 1988). What is new and unexpected is that the same forces that attract the molecules to the surface are capable, in the practice of the present invention, of holding such molecules in place on that surface for study in an SPM or an AFM. More particularly, the present invention relates to the potentiostatic preparation of molecular adsorbates for scanning probe microscopy in an electrochemical cell having a gold substrate, a platinum wire counter electrode and a silver wire reference electrode placed upon the microscope. The polymer to be observed is dissolved into a buffer solution which is non-reactive with the gold in the substrate and thereafter quickly deposited upon the substrate. Once the cell is filled, the reference electrode and the counter electrodes are connected and a stable layer of adsorbate is formed on the gold electrode where it can be readily scanned with the microscope probe.

Accordingly, the principle object of the present invention is to provide new and improved methodology for preparing molecular adsorbates for scanning probe microscopy.

Another object of the present invention is to provide methodology especially adapted to potentiostatically prepared negatively charged molecular adsorbates for scanning probe microscopy.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

DESCRIPTION OF PREFERRED EMBODIMENT

Figure 1:
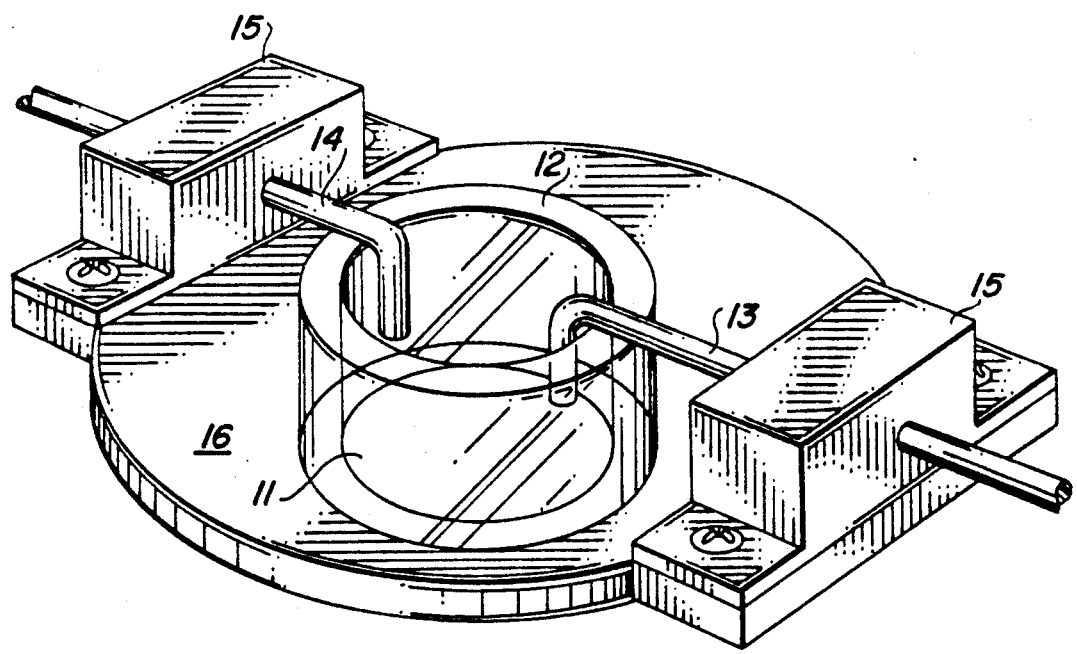
FIG. 1. is a schematic drawing of a simple electrochemical cell.

A small electrochemistry cell is mounted on an STM or AFM as described in my prior U.S. Pat. No. 4,868,396. A sketch of the current simplified cell is shown in FIG. 1. The substrate is Au (111), the counter electrode a platinum wire and the reference electrode a silver wire. It has been discovered that silver wires produce results that are identical to Ag/AgCl/KCl reference electrodes in these particular solutions, but are much easier to use and do not cause chlorine contamination of the substrate.

One practical arrangement of an electrochemistry cell is shown in FIG. 1. Referring to FIG. 1, the electrochemistry cell is designated by the general reference 10 and comprises a gold-on-mica substrate 11, a glass cell 12, having a polished bottom that forms a seal against the gold substrate. A platinum (Pt) wire counter electrode 13 and a silver (Ag) wire reference electrode 14 extend into cell 12. Each of these wires are longer than needed and a fresh cut surface is introduced into the cell for each experiment by advancing the electrode 13, 14 in its respective electrode holder 15, 15. A stainless steel plate 16 is glued to the lower exterior surface of glass cell 12 to hold down the substrate 11 and make electrical contact with the gold.

Cleanliness is critical. As will appear, an excess length of wire is used for each wire electrode. Before starting the next run, the used portion of the wire is cut away and a portion of the fresh wire is advanced into the cell. A fresh gold substrate is also used for each run.

Figure 2:
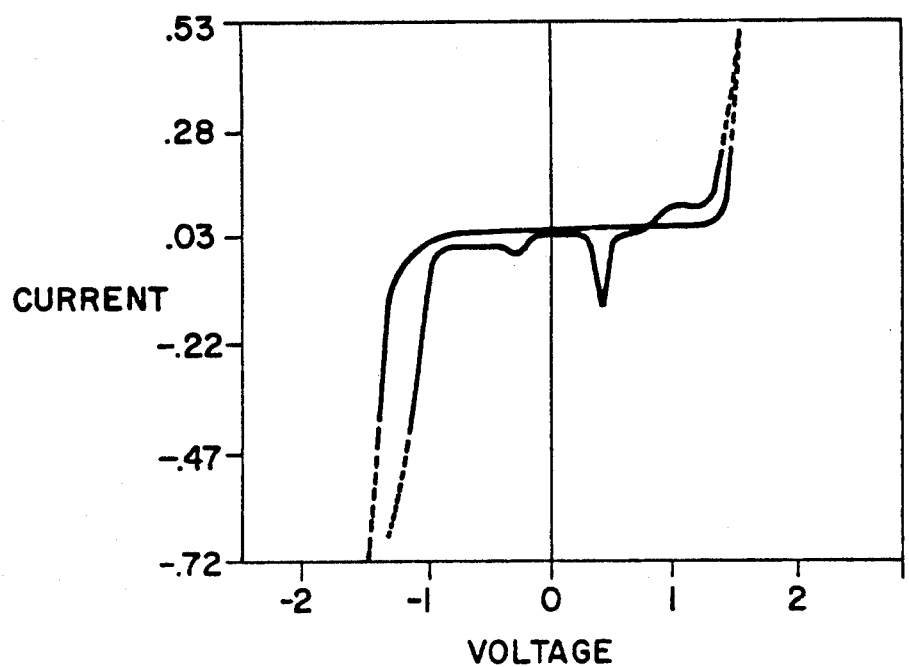
FIG. 2 is a cyclic voltammogram of a solution used for deposition of DNA taken in situ using a phosphate buffer solution adjusted to pH=6 with NaOH and containing 5 micrograms 5/mL of DNA.

In one practice of the present invention, a substrate is loaded onto the SPM. Clean reference and counter electrodes are placed into a clean glass cell on the substrate as shown in FIG. 1. The polymer is dissolved into a buffer solution that does not react with the gold over the appropriate range of substrate potentials. One suitable buffer solution for use with Au (111) between $-1.2$ and $=1.3$ V (vs. the Ag reference) is $NaH_2PO_4$. 10 mM adjusted to pH6 with NaOH. A cyclic voltammogram taken in situ is shown in FIG. 2. For sparse coverage of the electrode, a solution that, at full adsorption, gives less that a monolayer coverage of the macromolecule is used. For example, in a 50 microliter cell (0.5 $cm^2$ electrode area) less than 5 micrograms of DNA per mL of solution are required.

The solution is placed onto the substrate as quickly as possible (to minimize contamination) and, once the cell is full, the reference and counter electrodes are connected. Any positive potential (in case of DNA) between the potentials at which reactions occur (from $-0.2$ V vs. Ag to $+0.6$ V vs. Ag; the DNA bases oxidize at higher voltage) may be applied to the substrate.

There are some small reversible phosphate absorptions at lower potentials, but in the double-layer region macromolecules can be seen in stable arrangements all the way up to about 1 volt. The voltage employed in any given reading is correlated to the reference electrode. The voltage required for deposition is dependant upon the salt solution used. The values reported herein are for the phosphate buffer solution.

If the solutions are free of contamination and, in the case of the STM, the tip is well insulated, a very stable layer of absorbate is formed on the gold electrode. It may be scanned in situ repeatedly with no sign of sample movement or degradation. Indeed this is the salient feature of this invention, namely that the an adsorbate, when under potentiostatic control, is remarkably stable. Furthermore, the adsorbate layer may be lifted on and off the electrode surface at will simply by cycling the substrate potential between a positive value and $-0.2$ V (vs. Ag). Of course, these conditions represent a much diminished disruption of the solvated structure of the polymers compared to methods where the adsorbate is chemically reacted onto the substrate.

The coverage of the substrate, even with the simple layout shown in FIG. 1, is remarkably homogeneous. The whole problem of molecular microscopy is now reduced to scanning an area large enough to contain a few molecules (as calculated from the expected coverage, given the cell geometry and sample concentration) and then applying a suitable potential. Furthermore, reactions and various dynamic processes may be studied simply by allowing them to proceed in the cell (using components and a potential that avoid irreversible reactions) and then applying and attractive charge to the substrate.

Finally it should be noted that the problem of contamination is greatly reduced. Only those molecules that satisfy conditions for physical adsorption appear in the image. In contrast a vacuum or ambient image would show all contaminants.

This method can also be used to hold positively charged molecules providing the reaction current due to dissolved oxygen is eliminated. This may be done using degassed solutions and by operating in an inert gas enviroment.

Experiments demonstrate that this method yields excellent high resolution images of macromolecular absorbates in both the STM and the AFM. The electrodes and buffers herein disclosed are intended as representative preferred materials and not by way of limitation thereon.

From the foregoing, it is readily apparent that a useful embodiment of the present invention has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A method of preparing molecular adsorbates for scanning probe microscopy comprising: loading a substrate into a cell; placing the cell on a scanning probe microscope; placing a clean reference electrode in said cell; placing a clean counter electrode in said cell in spaced relationship to said reference electrode; dissolving a polymer containing negatively charged molecules into a buffer solution that is inert relative to said substrate; filling said cell with said polymer contained buffer solution; activating said reference electrode and said counter electrode and applying a potential to said substrate to deposit and secure said polymer onto said substrate for examination by said microscope.

2. A method according to claim 1 in which said substrate is gold (111).

3. A method according to claim 1 in which said reference electrode is silver wire.

4. A method according to claim 1 in which said counter electrode is platinum wire.

5. A method according to claim 1 in which said buffer solution is $NaH_2PO_4$ at a pH of 6.

6. A method according to claim 3 in which said electrodes are activated to a voltage of from about $-1.2$ up to about 1.3.

7. A method according to claim 5 in which said electrodes are activated to a voltage of from about $-1.2$ up to about 1.3.

8. A method according to claim 2 in which said reference electrode is silver wire.

9. A method according to claim 8 in which said counter electrode is platinum wire.

10. A method according to claim 9 in which said buffer solution is $NaH_2PO_4$ at a pH of 6.

11. A method according to claim 10 in which said electrodes are activated to a voltage of from about $-1.2$ up to about 1.3.

* * * * *

UNITED STATES PATENT AND TRADEMARK OFFICE
CERTIFICATE OF CORRECTION

PATENT NO. : 5,155,361

DATED : October 13, 1992

INVENTOR(S) : STUART M. LINDSAY

It is certified that error appears in the above-identified patent and that said Letters Patent is hereby corrected as shown below:

```
Column 1, line 11,
```

Insert a second paragraph in the section entitled "Introduction":

---This invention was made with Government support under contract No. N00014-90-J-1655 awarded by the Department of the Navy and grant DIR 89-20053 awarded by the National Science Foundation. The Government has certain rights in the invention.---.

Signed and Sealed this

Twelfth Day of October, 1993

*Attest:*

BRUCE LEHMAN

*Attesting Officer*   *Commissioner of Patents and Trademarks*